June 22, 1965  F. G. MALONEY  3,190,364
ROTARY CULTIVATOR EQUIPMENT
Filed July 3, 1963  2 Sheets-Sheet 1

Frederick G. Maloney,
INVENTOR.
WHANN & McMANIGAL
Attorneys for Applicant

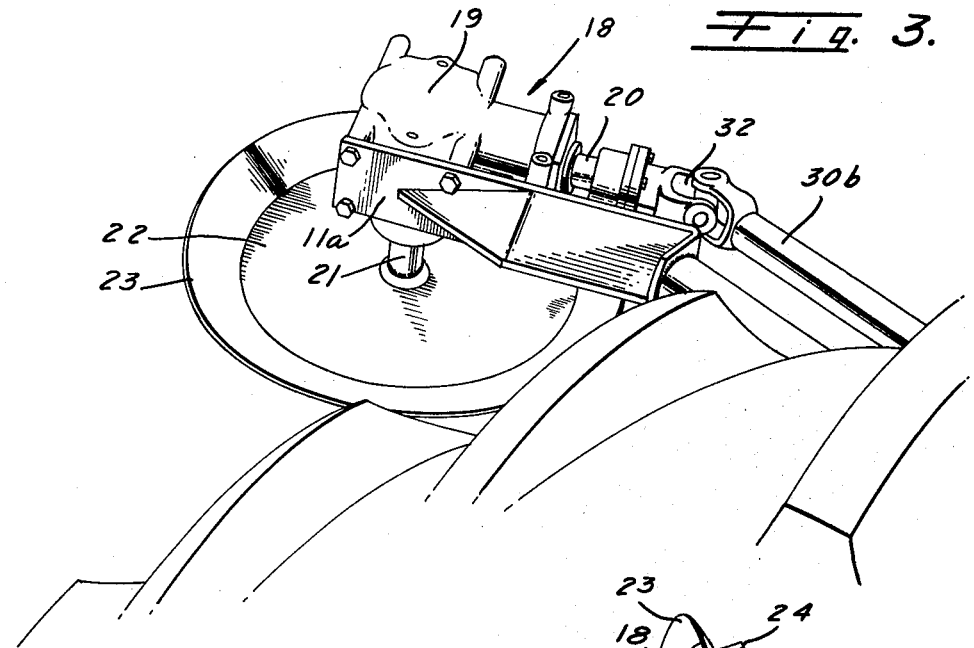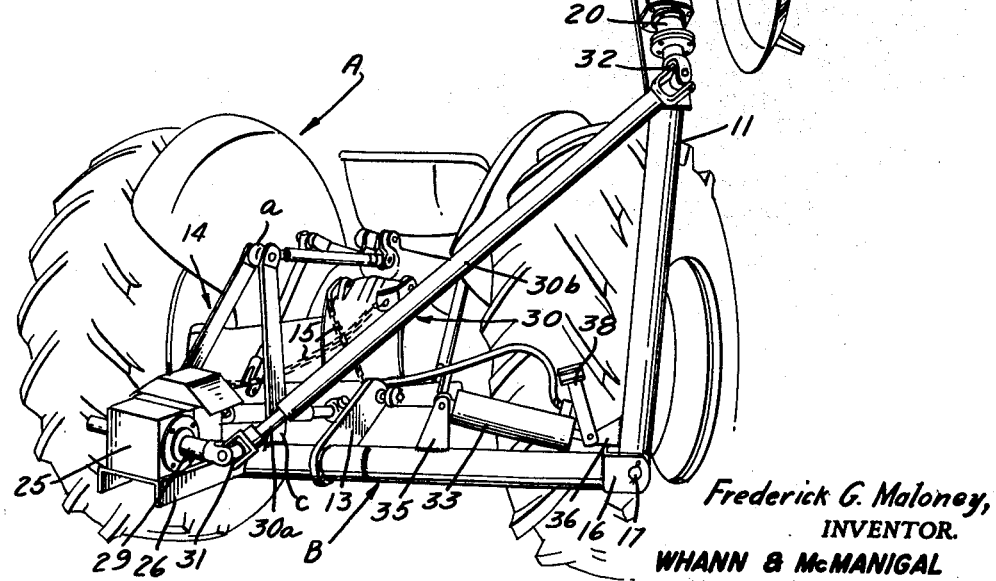

3,190,364
ROTARY CULTIVATOR EQUIPMENT
Frederick G. Maloney, Yakima, Wash., assignor to Edwards Equipment Company, Yakima, Wash., a corporation of Washington
Filed July 3, 1963, Ser. No. 292,577
3 Claims. (Cl. 172—111)

The present invention relates generally to earth working equipment, and is more particularly concerned with a power driven implement for breaking or cultivating the soil, and which may be guidingly directed in any desired working path.

It is one object of the herein described invention to provide a rotary cultivator attachment which may be connected to the conventional three-point tractor hitch, and which can thereafter be guided and controlled by the tractor operator, and wherein the cultivator unit is so located as to permit cultivation in a circular path around a tree or other object.

A further object of the herein described invention is to provide earth working apparatus having a toothed rotary cultivating head unit which is so constructed as to control the working depth automatically, and wherein the operative action of its soil working teeth is such as to result in a self cleaning action due to gravitational and centrifugal forces acting thereon.

Another object is to provide apparatus of the character described having a toothed rotary cultivating head unit which is floatingly supported, and which will follow the ground contour and remain in contact with the ground independently of rocking and other movements of an associated hauling or carrying vehicle. For example, when the tractor outboard wheel crosses a rill or furrow, or when the tractor wheels go over an obstruction.

Still another object is to provide a rotary-hoe cultivating device wherein the working unit is so supported as to permit its being selectively moved into a laterally extending position of use, and into a raised substantially right angled position of non-use enabling the device to be readily transported from one location to another.

Further objects of the invention will be brought out in the following part of the specification, wherein detailed description is for the purpose of fully disclosing the invention without placing limitations thereon.

Referring to the accompanying drawings, which are for illustrative purposes only:

FIG. 3 is an enlarged fragmentary perspective view of the cultivating unit of the equipment, as it appears in a position of use as seen substantially from the driver's seat of the tractor; and FIG. 4 is a rear perspective view looking towards the rear end of the tractor, the earth working equipment of the invention being shown in its non-use position for transporting from one location to another.

Referring more specifically to the drawings, for illustrative purposes, the earth working equipment of the present invention is disclosed as constituting in general a separate device A for utilization in connection with a tractor such as generally indicated at B by means of which the earth working equipment may be guided and moved in any desired working path, for example, in cultivating around trees and other objects. While the earth working equipment may be constructed as a separate wheeled device, which could be trailed behind the tractor, a more flexible and operative arrangement results when the equipment of the present invention is attached to and carried by the tractor. In the present application, the equipment will be considered in an arrangement wherein it is carried by the tractor.

Figure 1:
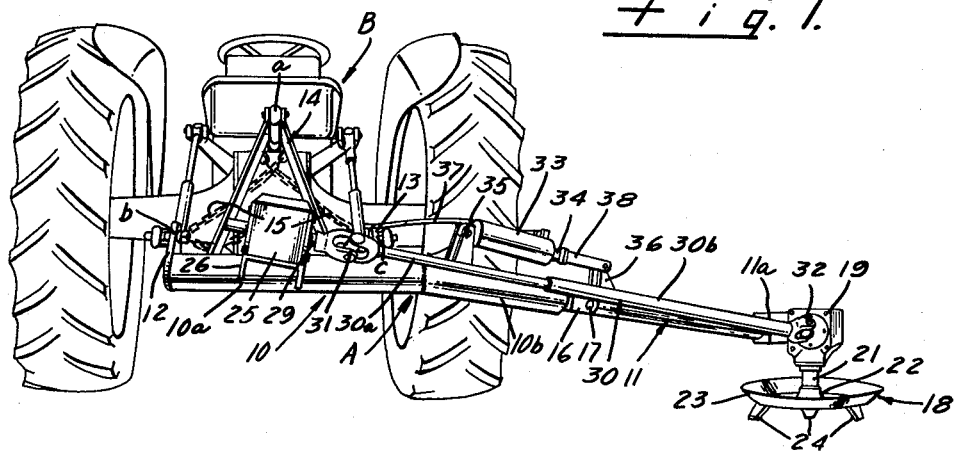
FIG. 1 is a rear elevational view of earth working equipment according to the present invention, showing its attachment to the rear end of a tractor, the parts being disposed in position of use.

More specifically, as shown in FIG. 1, the earth working equipment comprises a two part frame structure consisting of a fixed main part 10 and a movable part 11 in the form of an elongate boom.

The fixed main part consists of a tubular member which is formed of angularly related sections 10a and 10b. The section 10a is arranged for connection to the tractor, and for such purpose is fabricated with a pair of spaced arms 12 and 13, and an A-frame, as generally indicated at 14, which cooperate to form connecting brackets which are adapted to be secured in conventional manner at three-points as indicated at a, b and c which constitute the three-points of attachment of a conventional three-point tractor hitch. Crossed chains 15—15 having ends respectively anchored to the outer ends of arms 12 and 13, and other ends to securing lugs on the tractor operate to prevent tilting movements of the frame structure and tend to hold the main frame 10 in fixed relation with respect to the tractor.

The frame section 10b, as shown in FIG. 1, extends downwardly and forwardly so as to place its outermost end outwardly of the adjacent rear wheel of the tractor, this end being provided with spaced lugs 16—16 between which one end of the movable part 11 is positioned and pivotally secured by a suitable hinge pin 17 so as to support the movable part 11 for hinged swinging movements to positions of use and non-use. The outermost end portion of the movable part 11 is provided with an angularly extending end portion 11a which in effect forms a mounting bracket for the cultivating unit, as generally indicated by the numeral 18.

Figure 2:
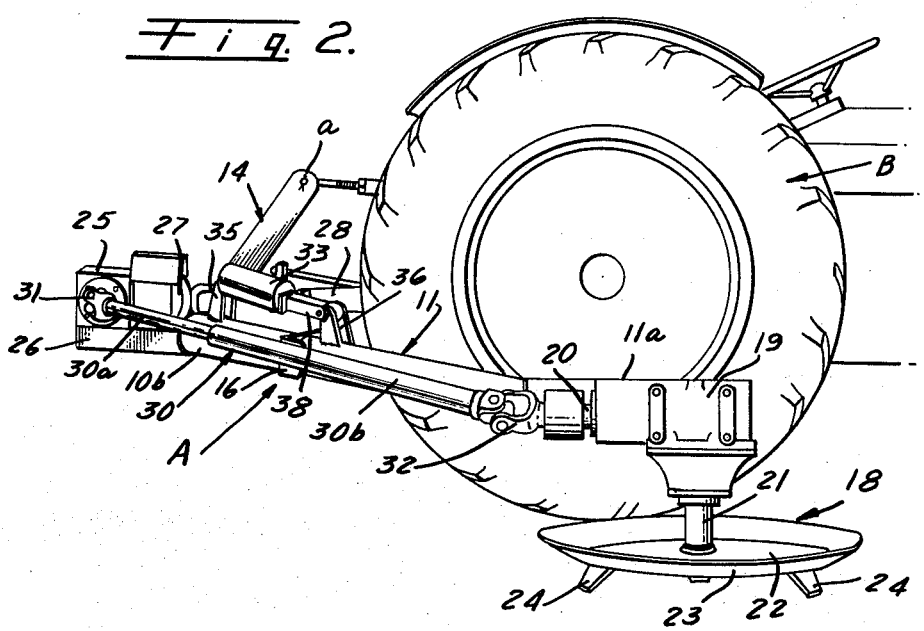
FIG. 2 is a side elevational view of the same showing the lateral relationship of the working parts with respect to the rear tractor wheels.

As shown in FIGS. 2 and 3, the cultivating unit or earth working tool is associated with an angle-gear box 19 which is secured to the end extension 11a by conventional means, but in such position that its input shaft 20 will extend along the end extension, while the output shaft 21 will depend substantially at right angles thereto. The shaft 21 carries a soil working head in the form of a dished circular member in which a bottom portion 22 is centrally connected to the output shaft 21, this bottom having a peripheral upturned circumferentially extending annular inclined marginal brim 23. The outer surface of the bottom 22 is adapted to engage the soil and automatically maintain the working depth of a plurality of downwardly and outwardly inclined teeth 24 which project from the bottom. These teeth may be fixedly or adjustably secured to the bottom 22, and may be arranged in any desired configuration that is they may be arranged in concentric or staggered eccentric relation.

Provision is made for supplying driving power to the cultivating unit from the tractor power take-off shaft. For this purpose, an angle-gear box 25 is supported on a channel bracket member 26 secured to the frame section 10a and projecting rearwardly thereof. The gear box has a driving connection with the tractor power take-off shaft which includes a torque limiting slip clutch 27 and a torque absorbing telescoping drive line 28. Power is delivered from the gear box through an output shaft 29. This output shaft 29 is connected with the input shaft 20 of gear box 19 by means of a variable length shaft 30 composed of telescoping sections 30a and 30b. The section 30a connects with the output shaft 29 through a universal joint 31, while the section 30b connects with the input shaft 20 through a universal joint 32.

Movement of the movable part 11 between its position of use, as shown in FIG. 1, and position of non-use permitting transportation between rather remotely spaced areas in which the movable part 11 extends substantially vertically upwardly as shown in FIG. 4, is accomplished by means of a fluid actuating device which for purpose of illustration has been shown as comprising a fluid cylinder 33 and a piston element (not shown) which connects with a power delivery member 34. One end of the fluid cylinder 33 is pivotally connected with bracket arms 35 secured to the frame section 10b, while the power delivery member is pivotally connected to bracket arms 36 secured to the movable part 11 adjacent its hinge connection with the frame section 10b. Suitable hose connections 37 supply actuating fluid to one end of the cylinder 33 from a suitable source provided on the tractor, for example, the same source which is used to operate the three-point lift of the tractor. The other end connection of the cylinder thus serves as a breather connection.

The fluid actuator as thus connected is utilized as a pull-type device and is arranged to be regulated with respect to the piston movement by means of a stop member in the form of an arm 38 which has one end pivoted on the bracket arm 36 so as to permit swinging movement of its opposite end into and out of the line of travel of the power delivery member 34. When the arm 38 is in the position shown in FIG. 1, the movement of the power delivery member in a direction to raise the movable part 11 is limited. The arm 38 in this case provides a stop which permits raising of the movable part sufficiently to raise the working tool from the ground so that the equipment may be moved to the next working position which may be relatively close and not require movement of the tool to the fully raised position as shown in FIG. 4 for movement to more distant areas. When it is desired to move the movable part 11 to a substantially vertical position as shown in FIG. 4, the arm 38 is merely swung out of the line of travel of the power delivery member, as shown. When the movable part 11 is again lowered to a position of use, the arm 38 will automatically assume its stop limiting position as shown in FIG. 1.

Referring generally to FIGS. 2 and 3, it will be seen that the cultivating unit, in its position of use, will be positioned outwardly of the adjacent tractor wheel and in general alignment with the axis of the rearward tractor wheels. This position is of particular advantage in that it permits the tractor operator to effectively control the movement of the cultivator movement so that as the tractor circles around the tree or object, the cultivating unit remains in a position between the tractor and the tree, thus permitting the operator to approach the tree as close as desired by merely tightening the circle in which he drives the tractor around the tree.

During the cultivating operation, the bottom 22 of the cultivating unit head, due to the inclined brim provides depth control as the unit is moved over and in contact with the ground.

The teeth 24 operate to tear out deep rooted weeds and due to the action of gravity and centrifugal force are self cleaning. The free floating action of the movable part 11 keeps the cultivating unit in contact with the soil at all times even though the outboard rear wheel of the tractor may go into a ditch or over a bump or ridge.

Various modifications may suggest themselves to those skilled in the art without departing from the spirit of my invention, and, hence, I do not wish to be restricted to the specific form shown or uses mentioned, except to the extent indicated in the appended claims, wherein various portions have been separated for clarity of reading and not for emphasis.

I claim:
1. Tractor carried ground cultivating equipment, comprising:
    (a) an attached frame structure positioned rearwardly of the rear wheels' axle of the tractor including a fixed generally transverse frame part and an elongate movable boom extending forwardly at an angle thereto and pivoted at its inner end on said fixed frame part for swinging movements to a position of use extending to one side of the tractor and to a raised substantially vertical position of non-use, said boom having an outer end portion adapted in said use position to extend generally forwardly to a position outwardly spaced and substantially aligned with the tractor rear wheels;
    (b) a rotatable ground working tool carried by said movable boom adjacent said outer end and having a substantially vertical axis of rotation in said use position of the boom, said tool including a dished head member having an upturned peripheral margin and a ground engaging bottom surface from which there extends a plurality of outwardly inclined projecting teeth adapted in the use position of said boom to operably engage the ground surface to be worked;
    (c) an angle-gear at said outer end of said boom having a driving connection with said tool and an input shaft;
    (d) an angle-gear on the fixed frame part having a driving connection with a power take-off of said tractor and an output shaft;
    (e) a telescoping shaft having its ends respectively connected through universal joints with said output and input shafts;
    (f) fluid cylinder-piston actuator means connecting said fixed frame part and said boom, and being energizable to move said boom between its use and non-use positions; and
    (g) releasable stop means for limiting the raising movement of said boom in its use position, whereby limited floating movements of the tool over the ground surface may occur, and the boom may be partially raised for relatively short transport movements from one working area to another.

2. Tractor carried ground cultivating equipment, comprising:
    (a) an attached frame structure positioned rearwardly of the rear wheels' axle of the tractor including a fixed generally transverse frame part and an elongate movable boom extending forwardly at an angle thereto and pivoted at its inner end on said fixed frame part for swinging movements to a position of use extending to one side of the tractor and to a raised substantially vertical position of non-use, said boom extension having an angularly deflected outer end portion adapted in said use position to extend generally forwardly and occupy a position outwardly spaced and substantially aligned with the tractor rear wheels;
    (b) a rotatable ground working tool supported on the outer end portion of said boom extension and having a substantially vertical axis of rotation in said use position of the boom, said tool including a dished head member having an upturned peripheral margin and a bottom surface for sliding engagement with a ground surface thereunder, said bottom having a plurality of exterior inclined projecting ground working teeth;
    (c) an angle-gear at said outer end of said boom having a driving connection with said tool and an input shaft;
    (d) an angle-gear on the fixed frame part inboard of the boom pivoted end having a driving connection with a power take-off of said tractor and an output shaft;
    (e) a telescoping shaft having its ends respectively connected through universal joints with said output and input shafts; and
    (f) fluid cylinder-piston actuator means connecting said fixed frame part and said boom, and being energizable to move said boom between its use and non-use positions, said boom and said telescoping shaft in said non-use position having their lowermost ends in spaced apart relation to form a stabilized support for the elevated working tool.

3. Tractor carried ground cultivating equipment, comprising:
   (a) a fixed frame structure positioned rearwardly of the rear wheels' axle of the tractor including a transverse elongate frame part having an outer end portion angularly deflected forwardly and terminating at one side of the tractor;
   (b) an elongate pivotally connected boom extension of said outer end portion swingably movable to a position of use extending to one side of the tractor and to a raised substantially vertical position of non-use, said boom extension having an angularly deflected outer end portion adapted in said use position to extend generally forwardly and occupy a position outwardly spaced and substantially aligned with the tractor rear wheels;
   (c) a rotatable ground working tool supported on the outer end portion of said boom extension and having a substantially vertical axis of rotation in said use position of the boom, said tool including a dished head member having an upturned peripheral margin and a bottom surface for sliding engagement with a ground surface thereunder, said bottom having a plurality of exterior inclined projecting ground working teeth;
   (d) a first angle-gear at said outer end portion of the boom extension having a driving connection with said tool and an input shaft;
   (e) a second angle-gear on the fixed frame positioned intermediate the tractor wheels and rearwardly of said transverse frame part, said second angle-gear having an input connection with a power take-off of said tractor and an output shaft;
   (f) a telescoping shaft having its ends respectively connected through universal joints with the input shaft of said first angle-gear and the output shaft of said second angle-gear; and
   (g) fluid cylinder-piston actuator means connecting said fixed frame part and said boom extension and being energizable to move said boom between its use and non-use positions, said boom extension and said telescopic shaft in said non-use position having their lowermost ends in spaced apart relation to cooperatively form a stabilized support for the elevated working tool.

References Cited by the Examiner

UNITED STATES PATENTS

| 1,958,405 | 5/34 | Anthony et al. | 56—25 |
| 2,651,249 | 9/53 | Morkoski | 172—98 X |
| 2,766,675 | 10/56 | Slick | 172—523 |
| 2,792,770 | 5/57 | Ober | 172—111 |
| 2,951,547 | 9/60 | Lawrence | 172—523 |
| 2,974,469 | 3/61 | Smith et al. | 172—125 X |
| 2,974,735 | 3/61 | Smith et al. | 172—125 X |
| 3,042,121 | 7/62 | Broetzman et al. | 92—13 X |
| 3,066,745 | 12/62 | Smith et al. | 172—59 |
| 3,117,632 | 1/64 | Caggiano | 172—38 |

FOREIGN PATENTS

| 228,692 | 6/60 | Australia. |
| 1,186,254 | 2/59 | France. |

T. GRAHAM CRAVER, *Primary Examiner.*

ABRAHAM G. STONE, *Examiner.*